April 1, 1930.                J. E. RIDLER                1,752,653
                              CUTTING TOOL
                            Filed Jan. 7, 1926
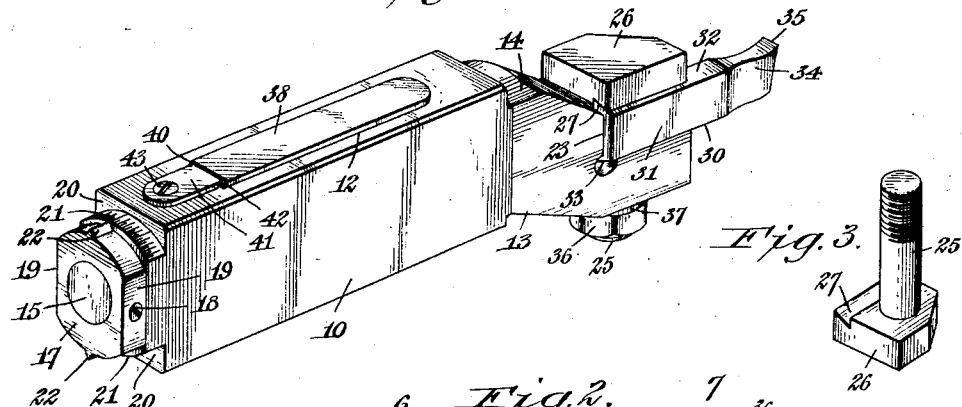
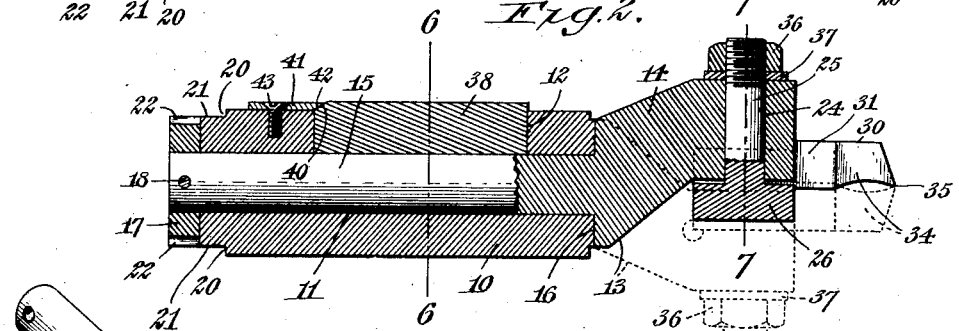
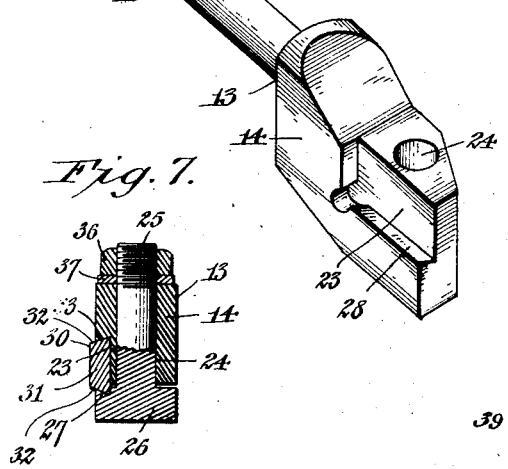
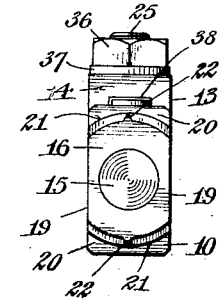
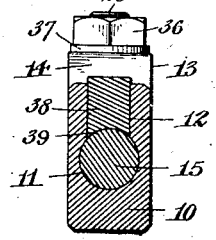
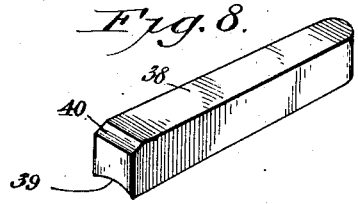
John E. Ridler, Inventor.
By Emil Hubert
Attorney.
Witness:
J.J.Oberst.

Patented Apr. 1, 1930

1,752,653

UNITED STATES PATENT OFFICE

JOHN E. RIDLER, OF BUFFALO, NEW YORK

CUTTING TOOL

Application filed January 7, 1926. Serial No. 79,787.

My invention relates to improvements in cutting tools, and has more particularly reference to a tool adapted for cutting screw threads.

In a screw-cutting machine, or a lathe, a comparatively large cutting tool is invariably clamped in the tool post by means of a set screw, or otherwise; and as commonly employed, this cutting tool is formed integral. When fastened into a tool post, it has its cutting edge facing upwardly, which necessitates the stock which is to be operated upon, to be rotated counter-clockwise when viewing the end of the stock projecting from the chuck. While my improved cutting tool may be used in the same manner, it is so constructed that the cutting element may be reversed, or in other words, be so positioned that the cutting edge faces downwardly, and when so positioned the rotation of the stock to be operated is in a clockwise or reverse direction. By reversing the edge of the cutting element and the direction of movement of the chuck and its stock from the accustomed practice, less chattering takes place; the edge of the cutting element will last longer; and any desired cut may be made or a complete severance of the stock take place within a shorter period of time.

One of the objects of my invention is to provide a cutting tool with a body portion having a tool-carrying member rotatably adjustable therein so that the cutting edge of a cutting element carried by said tool-carrying member may be positioned upwardly or downwardly, and while in either position be given angular adjustment, whereby the pitch of a thread to be cut may be easily determined.

Other objects of my invention are to improve on the construction, arrangement and general combination of parts of a tool of the kind mentioned, with a view of simplifying cutting tools embodying the special advantages herein stated, and to be stated.

With the above and other objects in view to appear hereinafter, the invention consists in the novel features of construction and in the arrangement and combination of parts to be hereinafter described and more particularly pointed out in the subjoined claims.

In the drawings:—

Fig. 1 is a perspective view of a cutting tool constructed in accordance with my invention.

Fig. 2 is a longitudinal section of the tool, showing the cutting element with its cutting edge directed downwardly, and a reverse arrangement thereof in dotted lines.

Fig. 3 is a detached perspective view of one of the two main members of the clamping portion of the tool.

Fig. 4 is a detached perspective view of the other main member of said clamping portion.

Fig. 5 is an end view of the device.

Fig. 6 is a transverse section taken on line 6—6, Fig. 2.

Fig. 7 is a transverse section taken on line 7—7, Fig. 2.

Fig. 8 is a detached perspective view of the retainer bar for retaining the shank or spindle of the clamping portion in any adjusted position.

The reference numeral 10 designates the body portion of the device, which is comparatively long and rectangular in cross section. It is provided with a longitudinal bore 11, which extends from end to end thereof, and extending from said bore 11 to one edge of said body portion is a slot 12.

13 is a tool-carrying member having a head 14, and a cylindrical shank or spindle 15 which extends through the bore 11 of the body portion 10. The inner end of said head 14 bears against one end of said body portion, as at 16, and the outer or free end of said shank or spindle extends outwardly beyond the other end of said body portion.

On the projecting end of said shank or spindle 15, a combined retainer and adjusting collar 17 is secured by means of a set screw 18, or otherwise. This collar has its edge cut-away or otherwise flattened at diametrically opposite portions, as at 19, so that when the parts of the device are in normal position, the flattened portions of this collar are flush with the sides of the body portion 10. The end of the body portion 10 adjacent said collar is cut away, as at 20, to form arcuate surfaces 21, one of which is provided with suitable graduation marks, the center of said arcuate surfaces being the axis of the shank or spindle 15.

Arranged on the two curved portions of the edge of the collar 17, at diametrically opposite points, are sharp ribs 22, the edges of which are in alinement with the arcuate surfaces 21 on the body portion 10.

The head 14 of the tool clamp is integral with the shank or spindle 15, and has its outer end offset so as to lie completely to one side of a plane passing lengthwise centrally through said shank or spindle. The offset portion of said head has a cut-away portion 23 at one side thereof, which is adapted to receive a cutting element, to be hereinafter described; and it also has a bolt hole 24 extending therethrough at right angles to the shank or spindle 15, through which hole is passed a clamping bolt 25 having a head 26 at one end thereof shaped to conform to the offset outer end of the head 14 which it overlies.

On the inner side of the head 26 of said clamping bolt at one side of the bolt 25 thereof, is a dovetailed groove 27, which is disposed in opposition to the cut-away portion 23 in the head 14, as best shown in Fig. 7.

Positioned in the cut-away portion 23 of the head 14 between the edge wall 28 thereof, which is undercut, and the undercut wall 29 of said dovetail groove 27 is a cutting element 30. This cutting element comprises a shank 31 having opposite beveled edges 32 adapted to be seated, respectively, against the undercut wall of the dovetailed groove 27 in the head 26 of said clamping bolt and against the undercut edge wall 28 of the cutaway portion 23 formed in the head 14. The cutting element is provided with a shaped cutting portion 34 at one end of said shank, said cutting portion being so shaped that a transverse cutting edge 35 is provided at the extremity of said cutting element.

With the clamping bolt 25 and its head in position to clamp the cutting element, a nut 36 is threaded onto the projecting end of said bolt and a washer 37 interposed between said nut and the outer edge of the offset portion of said head 14. With the parts in this position, the cutting edge 35 will be positioned in a plane passing longitudinally through the axis of the shank or spindle 15, and the upper indicating rib 22 will be in line with the center graduation mark on the arcuate surface 21 of the body portion 10, which graduation mark will indicate zero position and be so marked in any suitable manner. From this center graduation mark, indicating zero, the graduation marks on said arcuate surface extend laterally in opposite directions and range from zero upwardly toward opposite ends of the arcuate surface.

For the purpose of clamping and retaining the shank or spindle 15 of the tool-carrying member 13 within the body portion 10 of the tool, a hardened retainer key 38 is placed within the slot 12 of said body portion; said key having its inner face concaved, as at 39, and being of a depth somewhat greater than the depth of said slot so that it projects upwardly above the upper surface of the body portion 10 of the tool. At one end, the upper edge of this key is beveled, as at 40, and fastened to the upper surface of the body portion 10 is a keeper 41 in the form of a plate having an undercut extremity 42 bearing against the beveled portion 40 of said key, said keeper being fastened in place by a screw 43.

The body portion 10 of the tool, which may also be termed the mounting, is placed within the tool post of a screw machine, lathe, or similar machine, and the usual set screw employed for clamping a tool in position within the tool post is adapted to be tightened against the upper edge of the hardened retainer key 38, causing said key to bear firmly against the cylindrical shank or spindle 15 and hold the tool-carrying member of the tool in position.

Ordinarily, the position in which the tool-carrying member is used is shown in Fig. 2 of the drawings, and in this position the cutting edge 35 of the cutting element 31 trends in a true transverse direction, and when thus positioned, the sharpened indicating rib 25 at the upper side of the collar 17 is in line with the zero graduation mark on the body portion or mounting 10 of the tool. When feeding the tool against the stock to be operated upon, this cutting edge will cut a groove in the stock and, if fed to the center or axis of the stock, will completely sever the end portion of the stock from the remainder thereof.

As clearly shown in Fig. 1, the cutting edge 35 of the tool is shaped to cut a square screw thread, but in order to do so it is necessary to slightly incline the cutting edge laterally in one or the other direction, depending on whether or not said screw thread is to be a right hand or a left hand thread. This angularity is effected by loosening the set screw of the tool post in which the tool is held so as to release the retainer key 38 and relieve pressure of said key against the shank or spindle 15. By then taking hold of the collar 17 and turning it a part of a revolution, which might be slight or considerable, depending on the pitch of the thread to be cut, said spindle 15 will be rotated within the holder, and consequently the head 13 of the tool-carrying member given slight rotary motion so as to incline the cutting edge of the cutting element to the desired position. The exact position, of course, can be nicely determined by the indicating rib 25 and the graduation marks along which said rib is moved. When the shank or spindle is rotated to the desired degree, the set screw in the tool post is again tightened so that it bears firmly against the key and forces said key tightly against said shank or spindle.

The rotation of the stock while in contact with the cutting edge, and the gradual feeding of the tool into the stock, will cut a square screw thread of the desired pitch in a most convenient and efficient manner, without chattering and with considerable speed when the edge 35 of the cutting element is directed downwardly. It is, however, to be noted that by reason of this cutting edge being substantially in line with the longitudinal center of the tool, that the turning of the tool-carrying member through one-half of a complete revolution will bring the cutting edge of the cutting element to the exact same position it formerly had, except that said edge will be directed upwardly instead of downwardly; but it has been found by experience that a chattering noise occurs while the stock rotates in contact with the tool, or at least is more likely to occur, under such conditions, and that considerable slowing-up takes place during operation.

When it is desired to cut a V-shaped screw thread, it is simply necessary to substitute a cutting element having a cutting edge of the desired shape for that shown in the drawing, and that the cutting element will be inserted into the tool-carrying member of the device when a change in operation is made. When such changes are required, it is simply necessary to loosen the nut 36, so as to relieve pressure of the head 26 of the clamping bolt 25 from the tool, after which the cutting element can be drawn out lengthwise and another quickly inserted and firmly fastened by tightening the nut 36.

Having thus described my invention, what I claim is:—

1. A tool of the kind described, comprising an elongated mounting adapted to be inserted in the tool post of a machine, said mounting having a bore extending lengthwise therethrough and a slot opening outwardly from said bore, a tool-carrying member having a head bearing against one end of said mounting and a spindle extending from said head and rotatively arranged within said bore, a cutting element carried by said tool-carrying member and having its cutting edge in line with the axis of said spindle, and a retainer key fitting within said slot and adapted to be forced against said spindle for holding the latter in any adjusted position.

2. A tool of the kind described, comprising an elongated mounting adapted to be inserted into a tool post having a clamping screw, said mounting having an elongated bore extending therethrough and a slot extending from said bore outwardly, a tool-carrying member including a head bearing against one end of said mounting and a spindle extending from said head and passed through the bore of said mounting, means partly on said mounting and partly carried by said spindle to determine the rotative adjustment of said spindle, and a retainer key inserted in said slot and having a concaved inner face bearing against said spindle, said key being adapted to have the clamping screw of said tool post forced thereagainst to cause said key to maintain said spindle against rotative movement.

3. A tool of the kind described, comprising an elongated body portion having a cylindrical bore extending lengthwise therethrough and a slot opening from said bore outwardly to one side of said body portion, a tool-carrying member having a head bearing against one end of said body portion and a spindle extending from said head and passed through said bore, a collar on the projecting end of said spindle, a retainer key within said slot bearing against said spindle, and a keeper on said body portion engaging said retainer key.

4. A tool of the kind described, comprising an elongated body portion having a bore extending lengthwise therethrough and a slot extending outwardly from said bore, a tool clamp having a spindle rotatively arranged within said bore, a retainer key in said slot bearing against said spindle and extending outwardly beyond the surface of said body portion, said retainer key having its outer surface beveled at one end, and a keeper secured to said body portion and having an undercut end in contact with the beveled portion of said retainer key.

5. A tool of the kind described adapted to be secured as a unit in a tool post and comprising an elongated body portion, a tool-carrying member having a spindle longitudinally and rotatively mounted in said body portion and a head provided with a recess at one side and with a bolt hole extending through said head, said tool-carrying member being reversible in said body portion, a clamping bolt inserted through said bolt hole and having a head provided with a dovetailed groove co-operating with said recess, a non-rotatable cutting element having a shank provided with a beveled edge fitting said dovetailed groove and being clamped within said recess by the head of said bolt, said tool having a cutting edge in the plane of and transverse to the axis of said spindle, and a nut applied to said bolt to clamp said cutting element in position.

6. A tool of the kind described adapted to be secured as a unit in a tool post and comprising a body portion, a head having a spindle extending lengthwise into said body portion and having its outer end offset to position one edge thereof in line with the axis of said spindle, the offset portion of said head being provided with a recess and with a bolt hole, a cutting element positioned within said recess and having a beveled edge and its cutting edge in the plane of the axis of said spindle, and a clamping bolt secured within said bolt hole and having a head conforming to the offset portion of said first-mentioned head, said clamping bolt being provided with a dovetailed groove adapted to receive the beveled edge of said cutting element.

7. A tool of the kind described, comprising an elongated body portion having a tool-carrying member longitudinally and rotatably mounted in said body portion, said tool-carrying member including a head provided with a recess at one side having an undercut wall and with a bolt hole extending through said head, a clamping bolt inserted through said bolt hole and having a head provided with a dovetailed groove co-operating with said recess, a cutting element having a shank provided with opposite beveled edges fitting respectively against said undercut wall and against the undercut wall of said dovetailed groove and being clamped within said recess by the head of said bolt, said tool being reversible upon rotatable adjustment of said tool-carrying member to reverse the position of its cutting edge while retaining said edge in the same plane, and a nut applied to said bolt to clamp said cutting element in position.

In testimony whereof I affix my signature.

JOHN E. RIDLER.